US006594283B1

(12) United States Patent
Horspool et al.

(10) Patent No.: US 6,594,283 B1
(45) Date of Patent: Jul. 15, 2003

(54) NETWORK COMMUNICATION DEVICE

(75) Inventors: Nigel Horspool, Tervuren (BE); David Law, Kempston (GB); Quang Tran, Hemel Hempstead (GB); Patrick Overs, Dunstable (GB)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/203,184

(22) Filed: Nov. 30, 1998

(30) Foreign Application Priority Data

Nov. 28, 1997 (GB) .............................................. 9725371
Mar. 6, 1998 (GB) .............................................. 9804846

(51) Int. Cl.[7] ....................... H04L 12/413; H04L 12/44; H04L 12/56
(52) U.S. Cl. ....................... 370/501; 370/389; 370/425; 370/446
(58) Field of Search ................................. 370/389, 392, 370/393, 425, 492, 501, 274, 285, 445, 446, 451

(56) References Cited

U.S. PATENT DOCUMENTS

| 4,627,052 A | | 12/1986 | Hoare et al. |
| 5,274,631 A | | 12/1993 | Bhardwaj |
| 5,550,803 A | | 8/1996 | Crayford et al. |
| 5,598,581 A | | 1/1997 | Daines et al. |
| 6,041,061 A | * | 3/2000 | Su ............................. 370/461 |
| 6,041,065 A | * | 3/2000 | Melvin ....................... 370/492 |
| 6,052,362 A | * | 4/2000 | Somer ........................ 370/246 |
| 6,175,875 B1 | * | 1/2001 | Stapleton et al. ........... 709/250 |
| 6,229,811 B1 | * | 5/2001 | Raza et al. ................. 370/401 |
| 6,393,489 B1 | * | 5/2002 | Sambamurthy et al. ..... 708/250 |

FOREIGN PATENT DOCUMENTS

GB 2300336 A 10/1996 ........... H04L/25/20

* cited by examiner

Primary Examiner—Hassan Kizou
Assistant Examiner—Ahmed Elallam
(74) Attorney, Agent, or Firm—McDonnell Boehnen Hulbert & Berghoff

(57) ABSTRACT

A network communications device is arranged to have a fast throughput of data packets. This is achieved by recognising that, in protocols such as Ethernet, the first symbols in a data packet do not carry any data and therefore do not necessarily require to be properly carried through a communications hub. Rather, a known number of symbols are discarded from the start of a packet on receipt and replaced on re-transmission. This discarding reduces the reception delays particularly in bussed-architecture repeaters where bus arbitration must take place for each received packet.

7 Claims, 3 Drawing Sheets

NETWORK COMMUNICATION DEVICE

BACKGROUND OF THE INVENTION

1. Field of the Invention

The present invention relates to computer networking technology and in particular to communication devices such as Repeaters for interconnecting network devices in such networks.

2. The Prior Art

A Repeater is a very important component of computer networks such as local area networks as it provides the medium through which other devices can communicate with each other. In particular, a Repeater is provided with a number of communications ports and in the simplest configuration an end station, such as a computer is attached to each of the ports. A repeater functions such that any communication which is received on one port is retransmitted on all of the other ports, so that a communication sent out by any one device attached to the network is received by all of the others. In principle, the retransmission by a Repeater of a communication should be simultaneous with its reception at the receiving port. In this ideal situation, it will therefore be understood that a common communications medium is provided between all of the computers attached to the network via which communications can be sent between any of the devices. However, it is of course the case that, owing to the physical characteristics of the construction of the Repeater, the retransmission of a received communication is not instantaneous and the speed at which data can be passed through a Repeater has effects on the operation of the network as will be explained in the following.

One very common type of communications protocol in such networks is a carrier sense multiple access protocol of which Ethernet is a well known example. In such a protocol communications between computers attached to the network are by way of data packets having a pre defined format. Whenever a network user wishes to transmit a communications packet it simply attempts to access the communications medium provided by the Repeater or interconnected Repeaters and transmits the packet. The repeating function of the Repeater device mentioned above means that the communication packet reaches all of the other users on the network including the intended destination. In the event that another user is attempting to transmit a packet at the same time, the two or more transmitting units sense that a collision has occurred on the network and therefore that the transmitted data packet will not have been successfully received. In order for the collision to be sensed and properly acted upon, the collision must be sensed by the transmitting station before it has completed the transmission of a packet. If this occurs, the transmitting station will simply attempt, at the end of a predetermined period to retransmit the packet. If it completes transmission of the packet without receiving a collision detector signal, it will assume that the transmission was successful.

The above mentioned physical characteristics of the Repeater device have an impact on the operation of such protocol for the following reasons. In order for a collision to be properly sensed by a transmitting station, the transmitted packet must be received by the Repeaters and repeated to all segments of the network quickly enough so that if a collision occurs on any one of the network segments this can be relayed back, via the Repeaters, to the transmitting station before the end of the transmission of the packet in order that the collision can be properly sensed. It has been known that computer networks such as local area networks operating the Ethernet protocol can handle communications at 10 megabits per second (Mbps) for some while and it has been relatively easy to implement Repeaters for such network speeds which propagate data quickly enough so that up to approximately five Repeaters could be connected together and still obtain satisfactory network performance.

More recently there have been new standards set to increase the speed of communication over local area networks. In particular standards have been set defining network communication speeds of 100 Mbps. With communications occurring at such increased speeds, it clearly takes less time for a transmitting station to complete the transmission of a packet. It is therefore necessary that the packet should be more quickly repeated to all of the network segments in order that any collisions can be detected and returned to the transmitting station before the completion of the transmission of the packet.

One standard for Repeaters which has been defined for 100 Mbps networks is the Class I Repeater. With a Class I Repeater it is not permitted to connect two Repeaters together and so it is essentially necessary that each port on a Class I Repeater is directly connected to an end station or to a bridge or switch, which are other well known types of communications hub.

There is also more recently defined a standard of a Class II Repeater according to which standard, two Class II Repeaters may be connected together in the configuration of a network. With such a configuration it is of course the case that a transmitted packet must be propagated through two Repeaters to enable it to reach all of the network segments. To achieve this within the time constraints for detecting collisions as explained above, a Class II 100 Mbps Repeater must propagate received data to its other ports significantly quicker than Class I Repeaters.

Also, for 100 Mbps Repeaters, the communication standards do not allow any alterations in the lengths of the preambles to the data packets passing through the network. Therefore, as well as re-transmitting the packets quickly, a Class II Repeater must take considerable care to ensure that the whole of any received data packet, including the preamble, is accounted for and properly handled.

These constraints place considerable strain on the design of a Class II 100 Mbps Repeater. The implications of this are discussed further below.

Within a Repeater device, there is of course a certain architecture of the various parts of the Repeater to enable the ports to be connected to the Repeater core which will be on ASIC or other chip. In particular, there is provided within a Repeater device a physical layer device (PHY) provided for each port and the PHYs are then connected to the Repeater core. In one configuration it has been known to connect all of the PHYs directly to the Repeater core in a star configuration but this entails a large number of connections to the core.

A preferred Repeater architecture provides a receive data bus to which each PHY device is connected and which has a single connection to the Repeater core. Such an arrangement involving a data bus is advantageous as it reduces the number of connections, and therefore physical pins, which must be made on the ASIC. This architecture is further explained, insofar as it is relevant to the present invention, with reference to FIG. 2 which shows the interconnections made between ASIC 1 and PHY devices 2 in order to enable the reception of data. A Repeater device would of course also include interconnections for the retransmission of the received data but the present invention is related principally to the receive side of a Repeater device and therefore the relevant portions of the receive side are shown.

As shown in FIG. 2, there is provided a bus 10 to which all of the PHY devices 2 may put their received data (RXD) in order that the received data can be received at ASIC 1. There is of course present some bus control arrangements such that only one PHY device at a time is accessing the bus 10 and this will be outlined in the following, also with reference to the timing diagram of FIG. 3.

FIG. 3b illustrates the start of a received data packet and in particular is illustrated according to the known defined 100 Mbps protocol. The communications packet begins with a predetermined sequence of symbols (in particular J, K followed by a plurality of 5s) which are present to enable functions such as synchronising with the packet to be done before the information bearing portion of the packet arrives, and other known functions. Shortly before the arrival of the beginning of the data packet, the imminent arrival is sensed by the PHY device 2 and the device asserts its carrier sense signal (CRS) as illustrated in FIG. 3a. In a response to this, and if it is appropriate to do so, ASIC 1 permits access to the data bus by the PHY device in question by asserting the corresponding receive enable (RXEN) signal. The corresponding PHY device 2 then has access to data bus 10 in order to write the received data to the bus.

Another signal generated by PHY device 2 on reception of a data packet which is important for the proper reception of the data is the receive data valid (RXDV) signal and this signal is asserted by PHY device 2 in synchronism with the beginning of the communications packet, as illustrated in FIG. 3c. In order for the data to be properly received by ASIC 1 it is therefore necessary that the PHY device 2 which is receiving a data packet should receive the RXEN signal to authorise its access to the bus before the beginning of the data packet and the time at which it should assert RXDV. This time interval is designated t1 is FIG. 3.

At the lowest speeds at which previous Repeaters were permitted to work, time interval t1 was sufficiently long to allow this to occur.

However, in the context of Class II Repeaters as mentioned above, the speed of reception of the data by the PHY device must be high in order to meet the overall timing requirements and therefore data needs to be put onto data bus 10 very quickly upon its reception. The problem with this is that there is insufficient time for ASIC 1 to receive and respond to the carrier sense signal and to return the appropriate RXEN signal before the time at which the PHY device 2 is ready to put the beginning of the packet onto data bus 10 and to assert its RXDV signal. Therefore, either the PHY device 2 must delay the transmission of the data to the data bus 10, which is not acceptable in the context of a Class II Repeater, or an unknown amount of the preamble of the receive data packet would be lost due to the bite assertion of RXDV, which loss is not allowed in 100 Mbps networks. In particular, to avoid these problems, the RXEN signal would have to be asserted by ASIC 1 within 20 ns of receiving the carrier sense signal and this is very difficult if not impossible to achieve.

BRIEF DESCRIPTION OF THE INVENTION

The present invention provides a communication device for a computer network comprising:

a plurality of ports arranged to receive and transmit communications in the form of data packets from and to the network;

communication core means arranged to receive communications received at said ports and to implement a desired functionality for re-transmission of said communications via said ports;

data transfer means arranged to carry communications received at said ports to said communication core means;

receive means associated with each of said ports arranged to send received data packets to said data bus means without a predetermined portion from the beginning of the data packets; and transmit means associated with each said port arranged to receive data packets for transmission from said communication core means and to replace said predetermined portion at the beginning of the data packet for transmission from the respective port.

In particular, the present invention provides a Repeater for use in computer networks of the general type discussed above, in which the PHY device associated with each port, on reception of a communications packet for retransmission to the other ports, delays the assertion of its RXDV signal to a predetermined time within the preamble to the received packet and transmits all of the symbols subsequent to this predetermined time to the Repeater core.

It will be appreciated that, in the above bus-type arrangement, more time is permitted for the ASIC to provide the RXEN signal as it is necessary only to assert the RXEN signal prior to the RXDV assertion by the PHY device. The portion of the packet prior to the assertion of RXDV is therefore lost on reception of the packet by the PHY device but, as the beginning of all the communications packets would be the same, or in any event the actual bits in the beginning of the packet are not data carrying, the missing portion is replaced by other PHY devices within the overall Repeater device on retransmission of the packet to the remainder of the network. Therefore a complete packet appears to be transmitted through the Repeater device in accordance with the required standards, but a faster operation can be achieved.

In the preferred embodiment, it is the first two symbols of the communications packet preamble which are not transmitted through the Repeater.

Although particularly advantageous in Repeater devices as discussed above, this invention generally accelerates the reception and handling of data packets by network devices and therefore is also applicable to other network devices such as bridges and switches.

The invention therefore takes advantage of the fact, that in communication protocols such as Ethernet, no important data is contained in the first portion of a communications packet, this portion of the packet being generally a non-data carrying preamble to assist in sensing and synchronising with the packet.

The removal of a predetermined number of bits from the beginning of the packet by the physical layer device on reception of the packet allows more time for the Repeater to enable access to the Repeater core and get the remainder of the communications packet to the other physical layer devices for retransmission whilst still enabling the fast transmission times necessary to meet requirements of fast operating networks, and preserving the correct length of preamble as required by the 100 Mbps Ethernet standard as mentioned above. For this, it is the case that, in the invention, the preamble is completed by a physical layer device on retransmission of the packet so as to conform to network protocols.

BRIEF DESCRIPTION OF THE DRAWINGS

The present invention will be better understood from the following description of a preferred embodiment with reference to the accompanying drawings in which.

DETAILED DESCRIPTION OF THE DRAWINGS

In a preferred embodiment of this invention a network communications device is arranged to have a fast throughput of data packets. This is achieved by recognising that, in protocols such as Ethernet, the first symbols in a data packet do not carry any data and therefore do not necessarily require to be properly carried through a communications hub. Rather, a known number of symbols are discarded from the start of a packet on receipt and replaced on re-transmission. This discarding reduces the reception delays particularly in bussed-architecture repeaters where bus arbitration must take place for each received packet.

Figure 1:
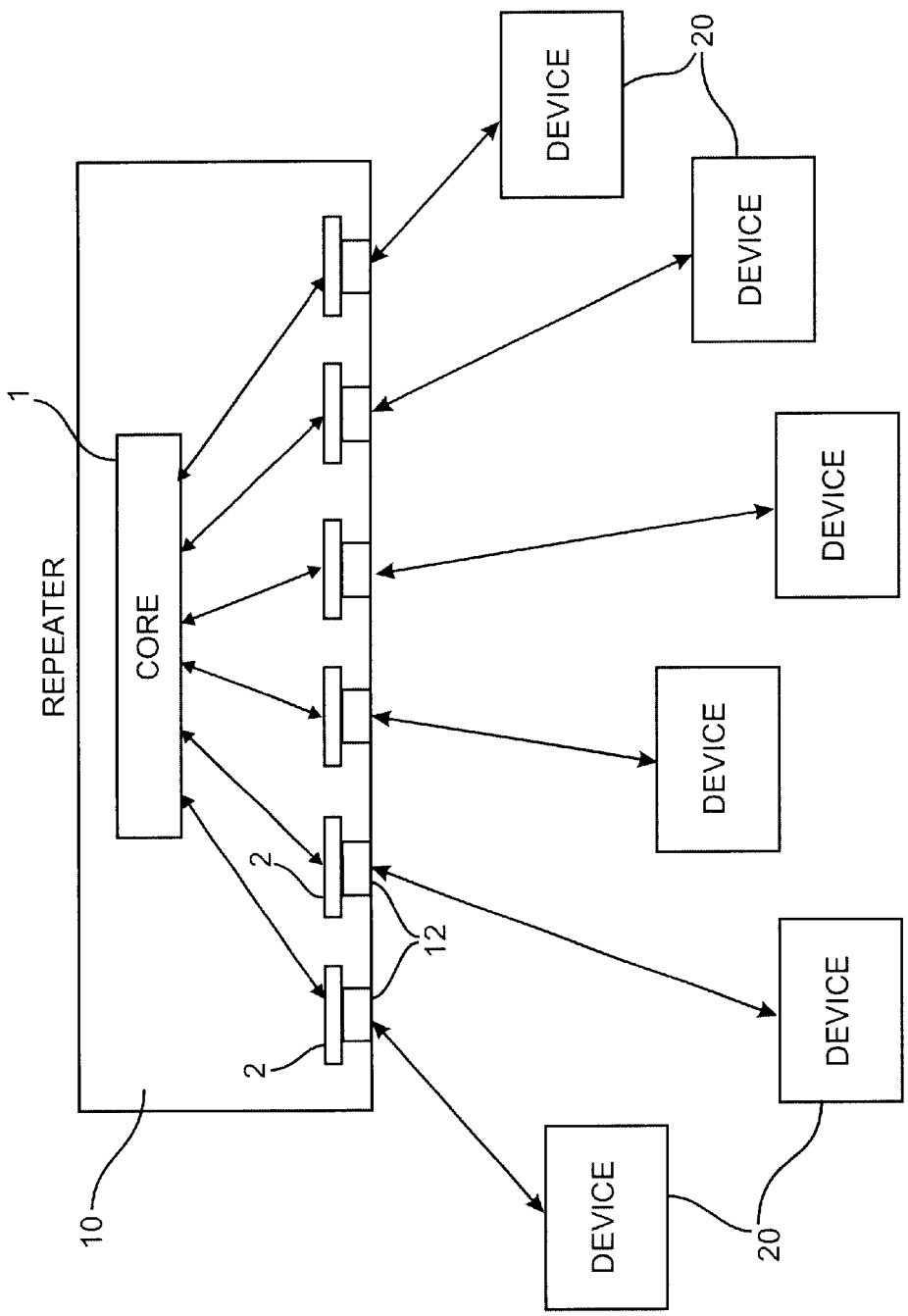
FIG. 1 is a schematic diagram of a communication device according to the invention in an exemplary network environment.

FIG. 1 illustrates in schematic form a communication device 10 according to the preferred embodiment in a network context. The network includes network devices 20 which may be terminal equipment such as PCs or printers or may be other communication devices connected to other portions of the network. As illustrated, communication device 10, which is, in the preferred embodiment, a repeater, has a plurality of ports 12 to which network devices 20 are connected for the transmission of communications in the form of data packets.

Associated with each of ports 12 is a physical layer device (PHY) 2 which deals with the transmission and reception of the communication as electrical signals in the network. At the heart of repeater 20 is core means 1, generally implemented as an ASIC, which provides the repeater functionality. Each of PHY device 2 is in communication with ASIC 1 as will be discussed in more detail below to enable ASIC 1 ro receive and re-transmit data packets from and to the required ones of ports 12.

Figure 2:
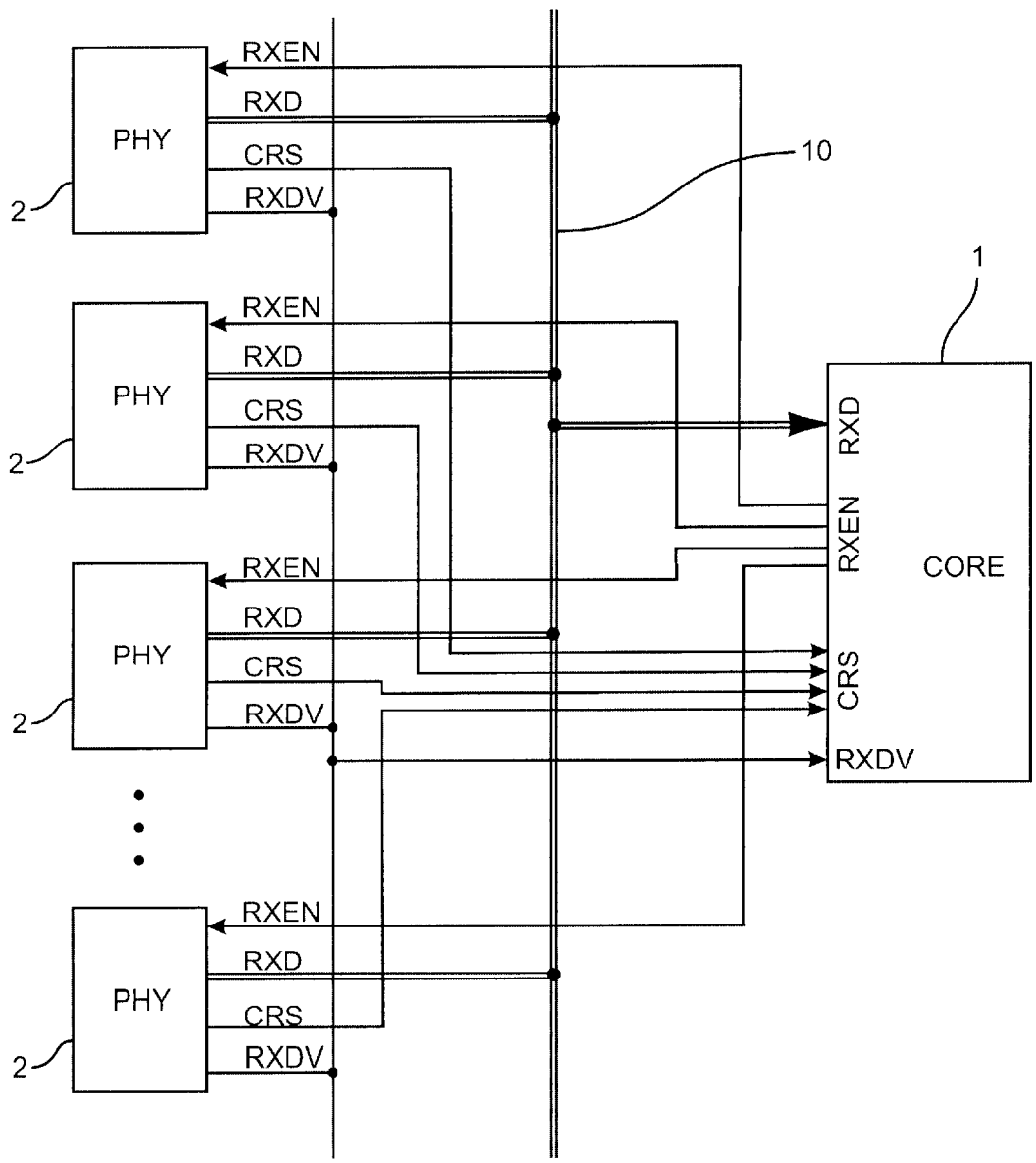
FIG. 2 is a schematic diagram illustrating the architecture of the receive side-of a Repeater according to the preferred embodiment.

As mentioned above, FIG. 2 illustrates a schematic outline of the receiver side of a Repeater device, comprising ASIC 1 performing the core functions of the Repeater and a plurality of PHY devices 2, one being provided for each port of the Repeater. Incoming communications are received at PHY devices 2 and are passed via the RXD bus 10 to ASIC 1 for retransmission from the other ports. Also as outlined above, access to the bus is requested by asserting the carrier sense signal (CRS) and access to the bus is granted by the return of the RXEN signal from ASIC 1. The other signal illustrated in FIG. 2 is receive data valid (RXDV) which is asserted by a PHY device 2 in synchronism with the transmission of a data packet to bus 10.

Also as mentioned above, FIG. 3a illustrates the assertion of CRS at time interval t1 before the beginning of the communications packet illustrated in FIG. 3b. In a 100 Mbps per second network time interval t1 may be as small as 20 ns.

Because the assertion of CRS is asynchronous with the timing which is ongoing within ASIC 1, there is no guarantee as to the time interval between the time at which a PHY device 2 asserts CRS and the time at which the corresponding RXEN signal is returned by ASIC 1. As illustrated in FIG. 3d RXEN will be asserted at some time later after the assertion of CRS and, in general, this will not be within the time interval t1.

According to this invention, on receipt of the RXEN signal the PHY device 2 does not immediately assert its RXDV signal and start sending receive data to the bus 10. Because there is no specific knowledge of the time at which RXEN will be provided, this would mean that an unknown portion of the preamble of the data packet would potentially be lost.

Rather it is the case that the PHY device 2 waits until a specific predetermined time during the preamble of the data packet before it asserts RXDV and transmits the remainder of the data packet to the data bus 10.

In the preferred embodiment, the PHY device 2 asserts RXDV at the time at the end of the second symbol (commonly known as the "K" symbol) as shown in FIG. 3e. RXDV therefore usefully and properly signals the timing of the received data packet to ASIC 1 and it is known with certainty which portions of the data packet passed before the assertion of RXDV. ASIC 1 can then retransmit the received parts of the receive data to the other PHYs for retransmission, and the other PHY devices 2 are arranged so as to re-complete the preamble to the data packet by the addition of the J and K symbols so that a complete data packet is retransmitted in the form it was received.

Figure 3:
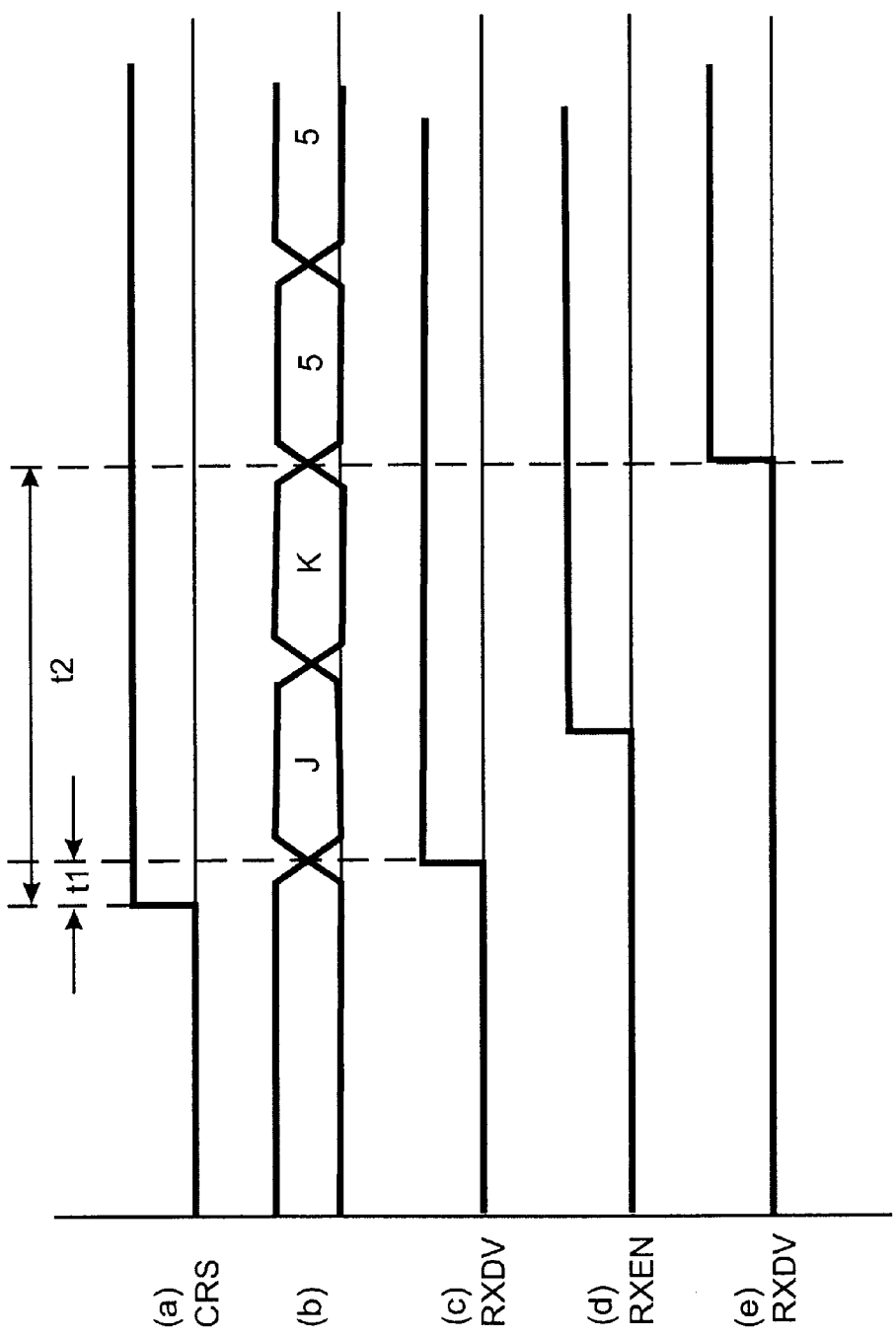
FIG. 3 is a timing diagram illustrating the operation of Repeater devices.

It will be appreciated therefore that the window of opportunity available for ASIC 1 to assert RXEN is extended to the time shown as t2 in FIG. 3 which typically equates to approximately 100 ns. In a typical implementation of the present invention RXEN is in fact asserted within 80 ns of the assertion of CRS and therefore the above described timing can be properly implemented.

The present invention therefore permits the implementation of a Class II 100 Mbps per second Repeater having a bus architecture.

What is claimed is:

1. A repeater for a computer network comprising:

a plurality of ports for receiving and transmitting data packets from and to the computer network, respectively;

a plurality of physical layer devices, one for each port of the plurality of ports, the plurality of physical layer devices receiving data packets from a respective port and sending data packets to the respective port;

a repeater core for receiving data packets received at the plurality of ports and for transmitting the data packets received through the plurality of ports to the computer network, each of the data packets received including a preamble at the beginning thereof;

a data bus coupled between the plurality of physical layer devices and the repeater core, the data bus carrying the data packets received at the plurality of ports to said repeater core;

wherein each of the plurality of physical layer devices sends the data packets received through the data bus without a predetermined portion of the preamble from the beginning of the data packets received;

wherein each of the plurality of physical layer devices receives data packets for transmission from said repeater core and restores said predetermined portion of the preamble at the beginning of the data packets for transmission from the respective port;

wherein said data bus is common to said plurality of physical layer devices, each of the plurality of physical layer devices requesting access to said data bus upon receiving a data packet at the respective port, and said repeater core responding to the request by controlling access to said data bus; and wherein said repeater core asserts an enable signal to indicate to a physical layer device that access to said data bus is granted, said enable signal being asserted during a time said predetermined portion of the data packet is being received at the respective port.

2. A repeater according to claim 1, wherein the network operates according to an Ethernet protocol in which the preamble of each of the data packets comprise a predetermined sequence of symbols and said predetermined portion of each of the data packets is at least one of said symbols.

3. A repeater for a computer network comprising:

a plurality of ports for receiving and transmitting communications in the form of data packets from and to the computer network, respectively;

a plurality of physical layer devices, one for each port of the plurality of ports, the plurality of physical layer devices receiving data packets from a respective port and sending data packets to the respective port;

a repeater core for receiving communications received at said port and to implement a repeater functionality whereby a data packet received at any of the ports is re-transmitted from other ports in said plurality of ports;

a data bus coupled between said repeater core and said plurality of physical layer devices, the data bus carrying the communications received at said ports to said repeater core;

wherein each of the plurality of physical layer devices sends received data packets to said data bus without a predetermined portion from the beginning of the received data packets;

wherein each of the plurality of physical layer devices receives data packets for transmission from said repeater core and replaces said predetermined portion at the beginning of the data packets for transmission from the respective port; and wherein each of the plurality of physical layer devices requests access to said data bus upon sensing arrival of a data packet at the respective port, and said repeater core being responsive to the request by asserting an enable signal to indicate to said physical layer device that access to said data bus is granted, said enable signal being asserted as said predetermined portion of the data packet is being received at said respective port.

4. A repeater according to claim 3 for the computer network operating according to an Ethernet protocol in which the beginning of each data packet comprises a predetermined sequence of symbols, and said predetermined portion consists of some of said symbols.

5. A repeater for a computer network comprising:

a plurality of ports for receiving and transmitting communications in the form of data packets from and to the computer network, respectively;

a plurality of physical layer devices, one for each port of the plurality of ports, the plurality of physical layer devices receiving data packets from a respective port and sending data packets to the respective port;

a repeater core for receiving communications received at said port and to implement a repeater functionality whereby a data packet received at any of said ports is retransmitted from other ports in said plurality of ports;

a data bus coupled between said repeater core and said plurality of physical layer devices, the data bus carrying the communications received at said ports to said repeater core;

wherein each of the plurality of physical layer devices senses a carrier signal denoting arrival of a data packet which includes a preamble of the beginning thereof and responsively sends a request signal to said repeater core to request access to said data bus, said repeater core being responsive to said request signal to enable access to said data bus for said data packet;

wherein each of the physical layer devices delays placing said data packet on said data bus (i) until a predetermined time during receipt of said preamble and (ii) the access to the data bus has been enabled for said data packet whereby a predetermined portion from the beginning of said preamble is removed; and wherein each of the physical layer devices receives data packets for transmission from said repeater core and restores said predetermined portion at the beginning of each data packet for transmission from the respective port.

6. A repeater according to claim 5 wherein said predetermined portion consists of a small integral number of symbols.

7. A repeater according to claim 5 wherein the data bus is common to the plurality of physical layer devices.

* * * * *